United States Patent
Wakeland et al.

[11] Patent Number: 5,999,994
[45] Date of Patent: Dec. 7, 1999

[54] DUAL PATH COMPUTER CONTROL SYSTEM

[75] Inventors: Carl K. Wakeland, Bedford; John M. Prickett, Fort Worth, both of Tex.

[73] Assignee: AST Research, Inc., Irvine, Calif.

[21] Appl. No.: 08/378,066

[22] Filed: Jan. 25, 1995

Related U.S. Application Data

[63] Continuation of application No. 08/232,320, Apr. 25, 1994, abandoned, which is a continuation of application No. 07/648,113, Jan. 31, 1991, abandoned.

[51] Int. Cl.$^6$ .................................................. G06F 13/14
[52] U.S. Cl. .............................. 710/38; 710/67; 710/240
[58] Field of Search ................................. 395/800, 775; 710/27–29, 38, 52, 58, 59, 67, 107, 110, 128, 240, 267; 84/470 R, 661; 178/17.5; 380/4

[56] References Cited

U.S. PATENT DOCUMENTS

| | | | |
|---|---|---|---|
| 3,936,600 | 2/1976 | Galbraith | 178/17.5 |
| 4,184,400 | 1/1980 | Niimi | 84/661 |
| 4,507,732 | 3/1985 | Catiller et al. | 710/59 |
| 4,716,523 | 12/1987 | Burrus, Jr. et al. | 710/28 |
| 4,912,633 | 3/1990 | Schweizer et al. | 710/110 |
| 4,942,606 | 7/1990 | Kaiser et al. | 380/4 |
| 5,088,378 | 2/1992 | DeLaTorre | 84/470 R |
| 5,237,692 | 8/1993 | Raasch et al. | 710/267 |
| 5,239,636 | 8/1993 | Dujari et al. | 710/52 |

*Primary Examiner*—John A. Follansbee
*Attorney, Agent, or Firm*—Knobbe, Martens, Olson & Bear, LLP

[57] ABSTRACT

A computer system having dual paths for controlling a peripheral device electrically associated with a host computer. The peripheral device is electrically connected to the host computer and to an independent control circuit. Control inputs for the peripheral device and data and/or control inputs for the host computer are generated by a keyboard or other input device and transmitted to an input controller which directs certain data and/or control inputs to the host computer for processing and directs certain peripheral device control inputs to a state machine for the generation of peripheral device control signals. In such a manner, the independent control circuit provides for the control of the peripheral device while the host computer may process data unrelated to the control of the peripheral device. In one aspect, control of the peripheral device may be effected by both the host computer and the independent control circuit. Accordingly, in this aspect, the independent control circuit further comprises an arbitrator which resolves any control conflicts that arise between the host computer and the independent control circuit.

21 Claims, 11 Drawing Sheets

| FIG. 5A | FIG. 5B | FIG. 5C |
| --- | --- | --- |
| FIG. 5D | FIG. 5E | FIG. 5F |

FIG. 5

DUAL PATH COMPUTER CONTROL SYSTEM

This is a continuation of co-pending application Ser. No. 08/232,320 filed on Apr. 25, 1994 which is a continuation of application Ser. No. 07/648,113 filed on Jan. 31, 1991, now abandoned.

BACKGROUND OF THE INVENTION

1. Field of the Invention

The present invention relates to a computer control system and, more particularly, to a dual path computer control system for regulating the operation of a peripheral device associated with a computer system.

2. Description of Related Art

Computer users have long recognized the need for controlling peripheral devices associated with a computer system. Prior control systems were limited, however, due to certain limitations inherent to computer systems. Computer systems have traditionally been designed as single task systems. In such systems, the computer queues jobs to be performed and processes the queued jobs in the order received. If a higher priority job arises, the computer will suspend operations associated with the current job to process the higher priority job. For this reason, computer system control of peripheral devices was often avoided because, in order to exercise control of the peripheral device, other operations such as data processing had to be suspended. This suspension of processing produces lower efficiency in computer processing power and, thus, longer processing time.

Furthermore, computer system control of peripheral devices has typically required software implementation. Such software routines most commonly arise with in connection with keyboard inputs where an operator programs the computer to accept a single keystroke in substitution for a series of key strokes, which series of key strokes orders the computer to perform a predetermined task. The key designated to substitute for this programmed series of steps is often dubbed a "hot key." Several deficiencies accompany the use of the pre-programmed hot key. The first liability associated with the use of the hot key arises in the step requiring the operator to program the machine to accept the single key stroke as a substitute for the series of key commands. While computers have evolved into an almost essential element of modern society, few users have achieved a level of proficiency that would enable them to draft such a program. The second liability associated with the use of the hot key lies in the fact that the computer must process the program initiated by the hot key rather than process a utility program in use at the time the hot key program was initiated. Initiation of the hot key program, therefore, may cause deterioration of the computer's efficiency similar to that associated with suspensions of operations resulting from computer system control of peripheral devices. A third liability associated with use of the hot key program relates to program compatibility. Hot key program are often referred to as "terminate and stay resident programs" because they are loaded into random access memory (or "RAM"). Problems arise when other, non-compatible, software, is loaded into the machine and interferes with the "terminate and stay resident program." While a hot key created out of hardware may avoid many of these liabilities, thus far, a "hardware hot key" has not been developed.

To avoid these problems, many computer systems provided for the control of peripheral devices through an independent interface. A leading example would be the technique in which audio speakers are incorporated into a computer system. Audio speakers are typically utilized to resonate sound signals generated by the computer system. In incorporating an audio speaker into the computer system, manufacturers have either neglected to provide any type of volume control for the audio speaker or have provided a manually operated electro-mechanical volume controller, for example, a potentiometer, which interfaces directly with the audio speaker for the control thereof. However, the use of such electro-mechanical volume controllers tend to increase the cost of the computer system associated therewith since the incorporation of mechanical components into the design of an electronic device tends to increase manufacturing expenses. The use of such volume controllers may also result in reduced efficiency in operating the associated computer system To operate the volume controller, a computer user must physically discontinue data input or other ongoing activities and manually adjust the volume, thereby suspending or delaying other operations in order to operate the volume controller.

Also, such volume controllers lack feedback signals to indicate to the user that proper volume adjustment has been achieved. For example, the computer system may only active the audio speaker periodically. If the user adjusts the audio speaker during an inactive period, no feedback will be received until the next activation of the speaker.

SUMMARY OF THE INVENTION

In one embodiment, the present invention is of a computer system which includes a host computer, an independent control circuit and a peripheral device electrically connected to the host computer and the independent control circuit. A single input means for generating control inputs for the peripheral device and data and/or control inputs for the host computer is provided. The peripheral device control inputs are directed to the independent control circuit for processing and the data and/or control inputs for the host computer are directed to the host computer for processing. The independent control circuit transmits control signals produced by processing the control inputs to the peripheral device. In one aspect, the host computer generates controls signals for transmission to the peripheral device and, in this aspect, the independent control circuit further comprises an arbitrator for arbitrating between the peripheral device control signals output by the independent control circuit and the peripheral device control signals output by the host computer. In another aspect, the control inputs for the peripheral device and data and/or control inputs for the host computer are directed to the independent control circuit and the host computer, respectively, by an input controller having a first section dedicated to the host computer and a second section dedicated to the independent control circuit. In yet another aspect, the input controller further comprises parallel programmed code which enables the input controller to trap specific programmable key sequences input thereto for transmission to the independent control circuit In still yet another aspect, the independent control circuit may include a state machine which generates timing signals in response to the receipt of the input signals from the input controller.

In another embodiment, the present invention is of a system for controlling a peripheral device independent of and simultaneous with ongoing operations being performed by a host computer electrically associated with the peripheral device. The control system includes a computer keyboard for generating data and/or control signals for the host computer and host-independent control signals for the peripheral device, an input controller for transmitting the data and/or control signals to the host computer and the host-independent control signals to a state machine. The state machine generates timing signals for controlling the peripheral device in response to the input signals received from the input controller. The timing signals are then transmitted to a multiplexer which selectively transmits control signals from the state machine or control signals from the host computer to the peripheral device. In one aspect, the host computer transmits signals to the state machine which indicate that the host computer is controlling the peripheral device. In another aspect, the state machine further includes combinatorial logic circuitry which disables the host-independent control signals when the host computer is controlling the peripheral device. In still another aspect, the system further includes a counter which indicates the level at which the peripheral device is being operated In yet another aspect, the system further includes a tone generator which generates an audio signal upon the transmission of a control signal to the peripheral device and, in still yet another aspect, the system includes a status bit generator which disables the state machine when the system is turned on.

In yet another embodiment, the present invention is of a keyboard actuated volume control system for use in a digital computer system having a host computer and a keyboard for providing data and control inputs to the host computer. The volume control system includes an input controller for receiving data and control signals from the keyboard and keyboard actuatable means for generating volume control signals and transmitting the generated volume control signals to the input controller. The input controller directs the volume control signals to a state machine and the data and control signals to the host computer. A volume generator is connected to the output of the state machine and generates audio tones in response to tone generation signals output by the host computer, the volume generator adjusting the volume of the generated audio tones in response to timing signals generated by the state machine. In one aspect, the host computer also generates volume control signals for transmission to the volume generator. In this aspect, the volume controller further includes an arbitrator for arbitrating between volume control signals generated by the host computer and the volume control signals transmitted to the state machine.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF A PREFERRED EMBODIMENT

Figure 1:
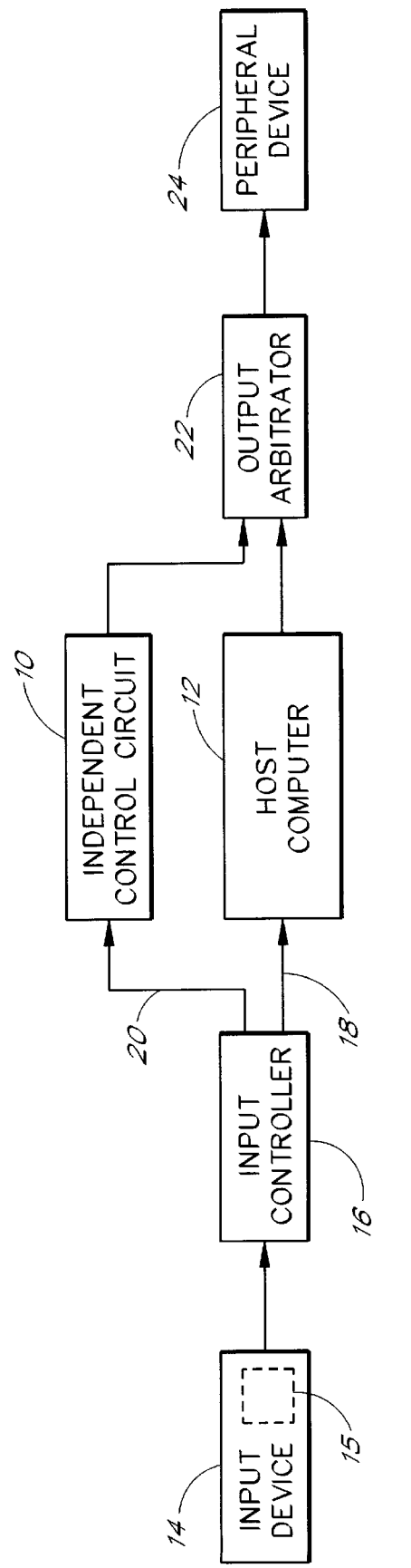
FIG. 1 is a block diagram of a computer system having a dual path control system constructed in accordance with the teachings of the present invention.

Referring first to FIG. 1, the overall configuration of a independent control circuit 10 which, in combination with a host computer 12, provides a dual path control system for a peripheral device 24 will now be described in greater detail. As may be seen in FIG. 1, the independent control circuit 10 is connected in parallel with the host computer 12, thereby enabling the two to operate simultaneously. An input device 14, for example, a computer keyboard, provides data and control inputs for the host computer 12 and control inputs for the peripheral device 24. As to be more fully set forth below, the control inputs for the peripheral device 24 may include a first series of control inputs for processing by the independent control circuit 10 and a second series of control inputs for processing by the host computer 12. Preferably, the input device 14 should include a pre-programmed hot key processing means 15 for generating the first series of control inputs for the peripheral device 24.

Data and control inputs generated by the input device 14 are transmitted to an input controller 16 electrically associated therewith. Typically, the inputs transmitted to the host computer 12 would include data and/or control inputs for use by the host computer 12 and control inputs for controlling the peripheral device 24. The input controller 16 is provided with programmable code means configured to read certain ones of the inputs generated by the input device 14 and transmit these inputs to the host computer 12 via a bus 18. The input controller 16 is further provided with parallel programmable code means which enables the input controller 16 to recognize certain other control inputs generated by the input device 14 as a specific programmable input sequence, i.e. an input sequence generated by the pre-programmed hot key processing means 15 and transmit these other control inputs to the independent control circuit 10 via a parallel bus 20. As to be more fully set forth below, the control inputs transmitted to the independent control circuit 10 are control inputs later transmitted to the peripheral device 24 for control thereof.

Upon receipt of the control inputs for the peripheral device 24, the independent control circuit 10 propagates peripheral device control signals to an output arbitrator 22. Similarly, if control inputs for the peripheral device 24 are input to the host computer 12 for later transmission to the peripheral device 24 or if the host computer 12 independently generates control signals for transmission to the peripheral device, the host computer 12 would propagate peripheral device control signals to the output arbitrator 22 as well. The output arbitrator 22 arbitrates between control signals received from the independent control circuit 10 and control signals received from the host computer 12. Thus, while the present invention permits control of the peripheral device 24 independent of the host computer 12, thereby avoiding any requirement to interrupt unrelated processing function being performed by the host computer 12, the host computer 12 still may be employed to effectuate the desired control function. As a result of the dual control capabilities, the output arbitrator 22 must arbitrate, which arbitration is described more fully below, between conflicting signals received from the independent control circuit 10 and the host computer 12. The output arbitrator 22, therefore, generates a busy signal which essentially blocks either the independent control circuit 10 or the host computer 12 from manipulating the peripheral device 24 when the parallel system has initiated its control commands.

Figure 2:
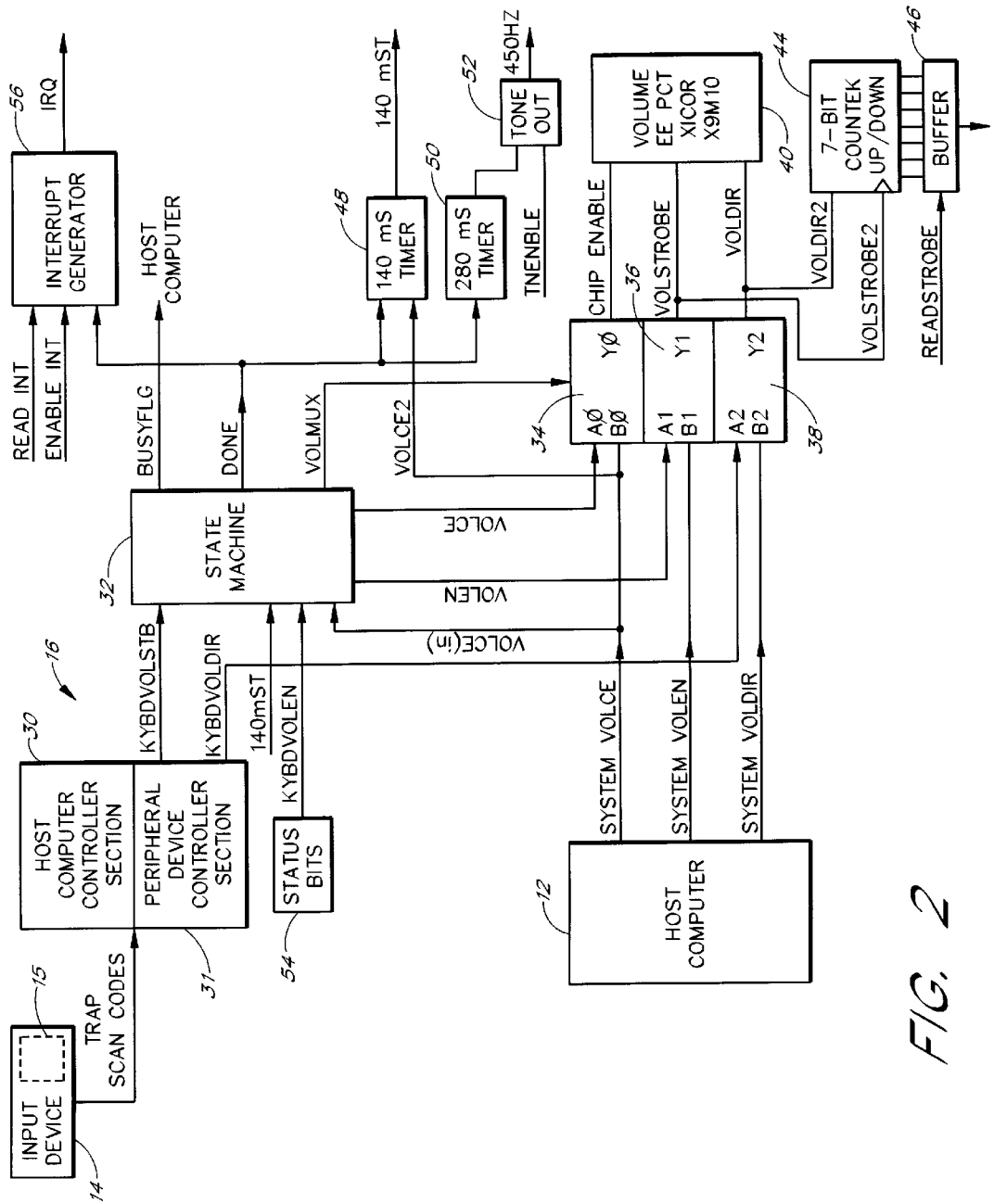
FIG. 2 is a schematic diagram illustrating the interconnection between the host computer and the independent control circuit of FIG. 1 as well as the interconnections between the components of the independent control circuit.

Referring next to FIG. 2, the dual path computer control system subject of the present invention shall now be described in greater detail. While the embodiment of the invention described herein is directed to a volume controller for an audio speaker electrically associated with a host computer in which the volume of tones generated by the audio speaker may be controlled by the host computer or independently controlled through a keyboard or other input means associated with the host computer, it should be clearly understood that the invention is equally applicable to control systems for other peripheral devices for which both control by the host computer and independent control through the keyboard or other input means is desireable.

In the embodiment of the invention illustrated in FIG. 2, the input controller 16, which, for example, may be a micro controller such as a Model 8042 micro controller manufactured by Intel Corporation of Santa Clara, Calif., is illustrated as including a first, or host computer, controller section 30 and a second, or peripheral device, controller section 31. Data and control inputs transmitted by the input device 14 are interpreted by the first and second controller sections 30, 31, respectively, of the input controller 16 and transmitted to either the independent control circuit 10 or the host computer 12, depending on their interpretation. The first controller section 30 interprets certain inputs as being related to data and/or control inputs intended for transmission to the host computer 12 and directs those inputs to the host computer 12 for processing. The second controller section 31 identifies certain inputs as being related to control inputs intended for transmission to the peripheral device 24 and directs those inputs to the independent control circuit 10 for processing.

More specifically, the first controller section 30 is comprised of pre-programmed code input the input controller 16 which enables the first controller section 30 to recognize certain inputs to the input controller 16 as being intended for transmission to the host computer 12. Similarly, the second controller section 31 is comprised of parallel pre-programmed code input the input controller 16 which enables the second controller section 31 to trap on particular programmable key sequences transmitted by the input device 14. These programmable key sequences direct the control of the peripheral device 24 shown in FIG. 1, and in this embodiment, control increases or decreases in the volume of tones generated by an audio speaker associated with the host computer 12. Furthermore, by providing parallel programed code within the input controller 16, the second controller section 31 can process the programmable key sequences directly controlling the peripheral device 24 while the first controller section 30 simultaneously processes the data and/or control inputs directing the operation of the host computer 12.

The first controller section 30 and the second controller section controller 31 accomplish the parallel programming through the dedication of two pins located on the micro controller chip and a portion of the micro controller chip's firmware capacity to the second controller section 31. The first pin is designated as "KYBDVOLSTB" (for Keyboard Enable Volume Strobe), which is electrically interconnected to a state machine 32, and the second pin is designated as "KYBDVOLDIR" (for Keyboard Volume Direction), which is electrically interconnected to a third 2-1 multiplexer 38. KYBDVOLSTB comprises a six microsecond, negative-going pulse which signals the state machine 32 that an increment/decrement of the volume is requested. The six microsecond pulse triggers the state machine 32 into commencing the control of the computer audio-speaker volume. KYBDVOLDIR comprises a direction control bit that indicates the polarity in which the audio-speaker volume should be adjusted. When set high, KYBDVOLDIR, indicates that the volume should be incremented; when set low, KYBDVOLDIR, instructs the control circuit to decrement the volume. Finally, KYBDVOLDIR remains stable, e.g., it does not alter the KYBDVOLDIR signal states between high and low, during pulsing of the KYBDVOLSTB.

The state machine 32 functions as a timing device that generates timing signals to a volume generator chip 40. The state machine 32 remains in an idle state, state zero, during non-active prods, but continues to monitor the second controller section 31. At each clock edge, the state machine 32 either stays in its idle state or, if it receives a six microsecond pulse from KYBDVOLSTB, it advances to its active state. The state machine 32 has two primary purposes. First, the state machine 32 must interpret commands originating from the second controller section 31. Second, since both the independent control circuit 10 and the host computer 12 can independently control the volume, the state machine 32 must arbitrate conflicting or simultaneous commands generated by the host computer 12 and the independent control circuit 10. As a result of these two duties, the state machine 32 functions as follows. Upon receipt of a valid comma, e.g., KYBDVOLSTB, the state machine 32 verifies the falling and rising edge of the six microsecond strobe and checks whether the host computer 12 possesses control of the volume generator chip 40. The state machine 32 determines whether or not the host computer 12 has control of the volume generator chip 40 by reading the value of the VOLCE(in) which comes off of the host computer 12. If the state machine 32 determines that the host computer 12 has control of the volume generator chip 40, the state machine 32 will ignore the commands received by the second controller section 31. Otherwise, the state machine 32 will assert the BUSYFLG. After asserting the BUSYFLG, the state machine 32 checks 140 mST to ensure that no overlap has occurred. If 140 mST now indicates that the host computer 12 has just finished using the volume generator chip 40 but that the necessary timeout period has not yet expired, the state machine 32 will abort the operation, otherwise it begins manipulation of the volume generator chip 40.

Once the state machine 32 has verified that no conflicts exist with the host computer 12 and it has assumed control of the volume generator chip 40, the state machine 32 will transmit signal VOLMUX (for Volume Multiplexer) to a first 2-1 multiplexer 34. VOLMUX instructs 2-1 multiplexers 34, 36 and 38 that the state machine 32 has control of the signals going to the volume generator chip 40. After transmitting VOLMUX, the state machine 32 generates pulses VOLCE (for Volume Chip Enable) and VOLEN (for Volume Enable). The state machine 32 initially sets VOLCE low and transmits it through the first 2-1 multiplexer 34 to the volume generator chip 40. The volume generator chip 40 requires VOLCE to have an initial low value in order to receive the forthcoming control commands. Next, the state machine 32 waits one clock cycle and then pulses VOLEN low three times, which when transmitted through the second 2-1 multiplexer 36 enters the volume generator chip 40 as the VOLSTROBE (for Volume Strobe) signal. The volume generator chip 40 possesses one-hundred discrete volume levels, therefore, in order to reduce the volume levels available to the user to thirty-three, the state machine 32 pulses VOLEN three times. The VOLSTROBE signal, thus, causes the volume level to be incremented or decremented three times. KYBDVOLDIR (for Keyboard Volume Direction) emanates from the second controller section 31 and proceeds directly to the volume generator chip 40 through the third 2-1 multiplexer 38. The volume generator chip 40 increments or decrements the volume depending upon the polarity of the VOLDIR signal; a high signal causes the volume to be incremented, while a low signal causes the volume to be decremented.

Still referring to FIG. 2, there is shown 7-bit counter 44 and buffer 46. As a result of the mutually independent control of the volume generator chip 40, by the host computer 12 and the independent control circuit 10, 7-bit counter 44 and buffer 46 are required as a means of storing the volume level such that both controllers are aware of the volume level. VOLDIR2 and VOLSTROBE2 are read by the 7-bit counter 44, which increments or decrements the volume level accordingly. Thus, the value of the volume level is stored. Since the 7-bit counter 44 mimics the volume control counter located within the volume generator chip 40, it will not increment above 99 or decrement below 0. The 7-bit counter 44 will hold at those values until the polarity of the VOLDIR signal is reversed, as is done in the volume generator chip 40. The value stored in 7-bit counter 44 and the buffer 46 is changed regardless of whether the host computer 12 or the independent control circuit 10 adjusts the volume level. The host computer 12 reads the value of the volume level through the READSTROBE input to the buffer 46.

After changing the volume level, the state machine 32 issues an internal DONE command which initializes two internal retriggerable digital monostable timers 48 and 50. The retriggerable digital monostable timer 48 possesses a 140 millisecond timeout period, while retriggerable digital monostable timer 50 has a timeout period of 280 milliseconds. The DONE signal remains high while the state machine 32 is in the process of controlling the volume generator chip 40 and until the expiration the 140 millisecond period of the retriggerable digital monostable timer 48. The 140 millisecond timeout of the retriggerable digital monostable timer 48 also maintains the VOLCE to the volume control in an asserted condition for its entire 140 millisecond period At the same time, the BUSYFLG remains in a high or asserted state. The retriggerable digital monostable timer 48 minimizes unnecessary toggling of the VOLCE line, thereby extending the service life of the volume generator chip 40. The selection of a 140 millisecond timeout ensures that if a 10 character/second standard typematic rate is used, the VOLCE will not be cycled more than once if the control sequence is pressed and held by the user. Additionally, if the user is holding down the key sequence of the independent control circuit 10, the host computer 12 is prevented from adjusting the volume generator chip 40 until the user releases the keys and the retriggerable digital monostable timer 48 completes its 140 millisecond timeout. Furthermore, the host computer 12 is tied into the retriggerable digital monostable timer 48 through signal VOLCE2. The VOLCE2 signal activates the retriggerable digital monostable timer 48 just as the DONE signal from the state machine 32 triggers it. Thus, once the retriggerable digital monostable timer 48 is triggered by the host computer 12, the state machine 32 cannot control the volume until the 140 millisecond period has elapsed.

The retriggerable digital monostable timer 50 enables the tone out generator 52. The tone out generator 52 provides the user with actual feedback of the newly set volume by generating a 450 hertz tone during the 280 millisecond timeout period of the retriggerable digital monostable timer 50. If the key sequence is held down, thus giving typematic input, the retriggerable digital monostable timer 50 will be retriggered, resulting in continuous tone generation from the tone out generator 52.

The status bit generator 54 enables or disables the entire independent control circuit 10 through KYBDVOLEN (for Keyboard Volume Enable). On power-up, KYBDVOLEN is initialized to a low condition, which completely disables the independent control circuit 10. Adjustment of the volume level, however, may still occur by means of control signals generated by the host computer 12. In addition, TNENBLE (for Tone Enable) enables the tone out generator 52 to generate the audio feedback heard by the user. During power-up TNENBLE is set low and, thus, disabled If TNENBLE is set low and KYBDVOLEN is set high, the volume control of the independent control circuit 10 will operate, but no feedback tone will be generated by the tone out generator 52.

Still referring to FIG. 2, there is shown an interrupt generator 56 having an input connected to the DONE signal. In one aspect of the invention, it is contemplated that the interrupt generator 56 may be utilized to provide control of additional peripheral devices by the independent control circuit 10. For example, it is contemplated that drivers could be added here for providing on-screen indicators of volume change. The driver would access the interrupt to execute the on-screen indicator. As control of such prospective additional peripheral devices may also require control signals generated by the host computer 12, control lines ENABLEINT (for Enable Interrupt) and READINT (for Read Interrupt) are provided from the host computer 12 to the interrupt generator 56. Finally, the interrupt generator 56 outputs an IRQ signal to the host computer 12.

Figure 3:
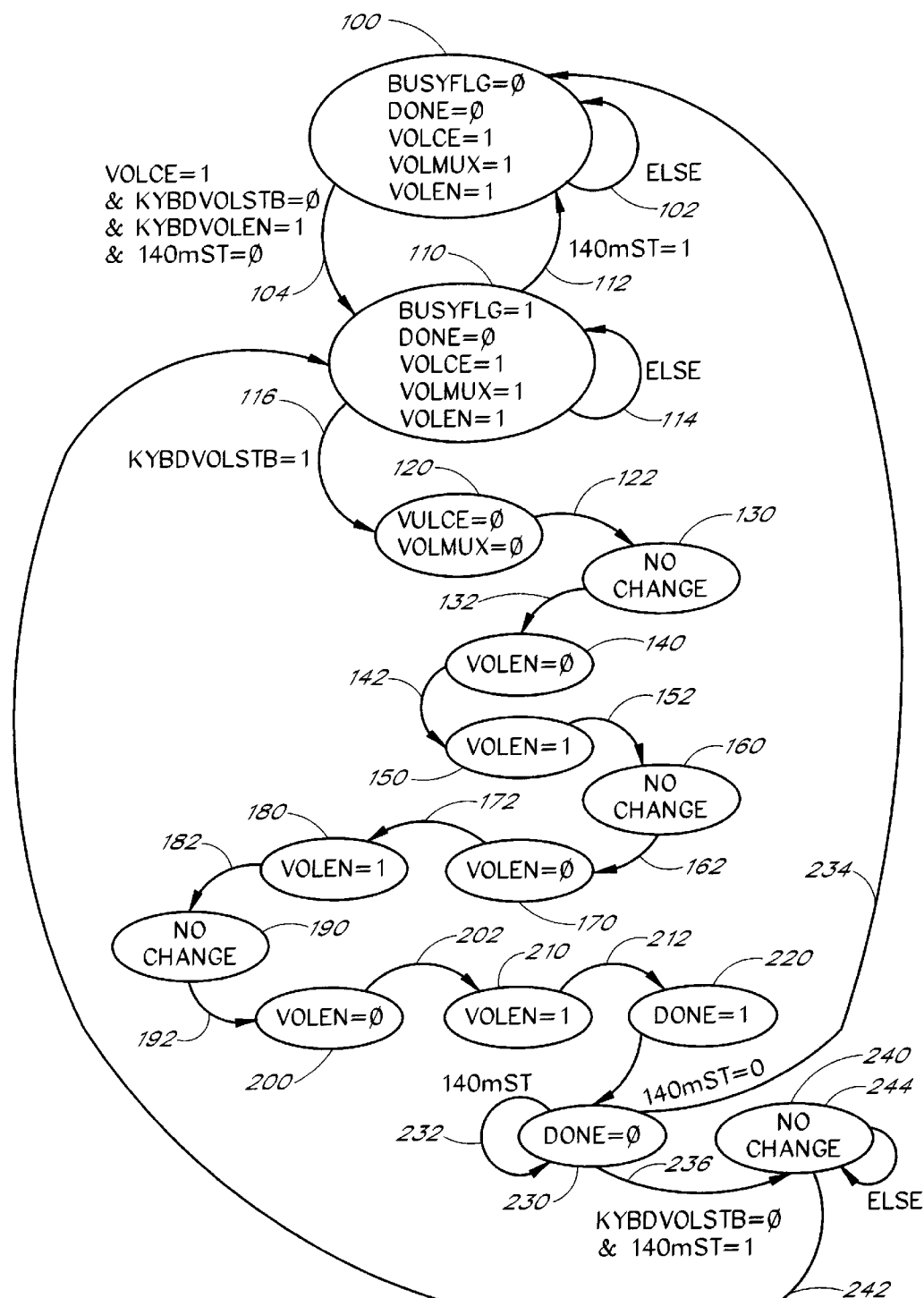
FIG. 3 is a logic flow diagram illustrating the sequence of control steps and the control element states which realize the desired control function of the independent control circuit of FIG. 2.

Referring now to FIG. 3, there is shown the logic flow of the independent control circuit 10 as applied to a volume controller for a computer system. Bubble 100 indicates the power-up or idle state of the independent control circuit 10. When the host computer 12 initially powers-up or the user has not accessed the independent control circuit 10, the five output signals generated by the state machine 32 are set to the values indicated within the step 100. Namely, BUSYFLG is set low; DONE is set low; Volume Chip Enable, VOLCE, is set high; Volume Multiplexer, VOLMUX, is set high; and Volume Enable, VOLEN, is set high Path 102 illustrates the idle state of bubble 100. If the user does not initiate the control sequence, then ELSE statement of path 102 merely returns to bubble 100 on the subsequent clock edge.

Path 104 illustrates the conditions required for the system to progress to bubble 110. The Volume Chip Enable, VOLCE, remains at its high value, the Keyboard Volume Strobe, KYBDVOLSTB, is at a low value, the Keyboard Volume Enable, KYBDVOLEN, is high and the 140 millisecond, retriggerable digital monostable timer 48 is set low. If each of these conditions are met the logic proceeds to bubble 110, wherein each of five output signals generated by the state machine 32 appears again. All of the signals except BUS remain in the same state, with BUSYFLG changing from low to high. Bubble 110 performs a verification step. The independent control circuit 10 confirms that the conditions of path 104 are maintained and that the host computer 12 was not at a transition between states when the conditions of path 104 were satisfied. Path 112 directs the logic back to bubble 100 from bubble 110 if a transition was in progress, as would be indicated by the 140 millisecond, retriggerable digital monostable timer 48 being set high. Otherwise, the logic remains idle in bubble 110 until the Keyboard Volume Strobe, KYBDVOLSTB, goes to a high state, as shown at path 116. A high state of KYBDVOLSTB indicates a user command and takes the logic to bubble 120.

At bubble 120, the independent control circuit 10 switches the Volume Chip Enable, VOLCE, to low, thereby enabling the volume generator chip 40. Additionally, the independent control circuit 10 takes control of the three 2-1 multiplexers 34, 36 and 38 by lowering the state of the Volume Multiplexer, VOLMUX, signal. At this point the independent control circuit 10 is ready to adjust the volume level of the volume generator chip 40.

Modification of the volume level within the volume generator chip 40 occurs by toggling the Volume Enable, VOLEN, low and then high three times. The toggling begins after the logic flow has followed path 122 to bubble 130; no change is effected upon the system at babble 130. Next, path 132 leads to bubble 140, wherein the first state change, from high to low, to the VOLEN signal is realized. From bubble 140, the logic proceeds to bubble 150 along path 142. At bubble 150 the VOLEN signal is changed back to a high state. Path 152 next brings the independent control circuit 10 to bubble 160, wherein no change occurs. Path 162 leads to the beginning of the second cycle at bubble 170, wherein the VOLEN signal switches back to a low state. The logic leaves bubble 170, via path 172, and travels to bubble 180 so that the VOLEN signal may be pulsed back to its high state, thereby ending the second pulse. Path 182 leads to bubble 190 wherein no change occurs to the independent control circuit 10. The third and final pulse begins as the logic reaches bubble 200 by way of path 192. Bubble 200 illustrates the state change of the VOLEN signal, from a high to a low state. Following path 202, the VOLEN signal is switched back to a high state in bubble 210, which transition completes the pulsing of the VOLEN signal and the change to the volume generator chip 40. Path 212 takes the logic to bubble 220 wherein the DONE signal is set high, thereby activating the retriggerable digital monostable timers 48 and 50.

Next, path 222 leads the logic to bubble 230 wherein the DONE signal is set low. Once the retriggerable digital monostable timer 48 completes its 140 millisecond timeout period, as indicated by path 234, wherein the retriggerable digital monostable timer 48 is low, the logic proceeds back to bubble 100 and its idle state. If, however, the 140 millisecond, retriggerable digital monostable timer 48 has not completed its timeout, as indicated by path 232, the logic remains in bubble 230. Additionally, the logic may flow to bubble 240, via path 236. If the user sends an additional command to adjust the volume, as indicated before the 140 millisecond timeout has expired by the Keyboard Volume Strobe, KYBDVOLSTB, being set low while the signal 140 mST remains high along path 236, then the logic proceeds to bubble 240 wherein no change occurs. Since the user desires further volume adjustment, the logic flows back to bubble 120, via path 242, rather than proceeding to the idle state at bubble 100. Path 242 will be followed if the Keyboard Volume Strobe, KYBDVOLSTB, and the Keyboard Volume Enable, KYBDVOLEN, are set high If the conditions for path 242 are not met, then the ELSE path 244 will be followed. The paths 236 and 242 reflect the conditions required to get to bubble 120 from bubble 100. Namely, the independent control system waits for a falling and rising edge on the KYBDVOLSTB. Thus, path 236 indicates a falling edge of the KYBDVOLSTB, while path 242 indicates the rising edge of KYBDVOLSTB.

Figure 4:
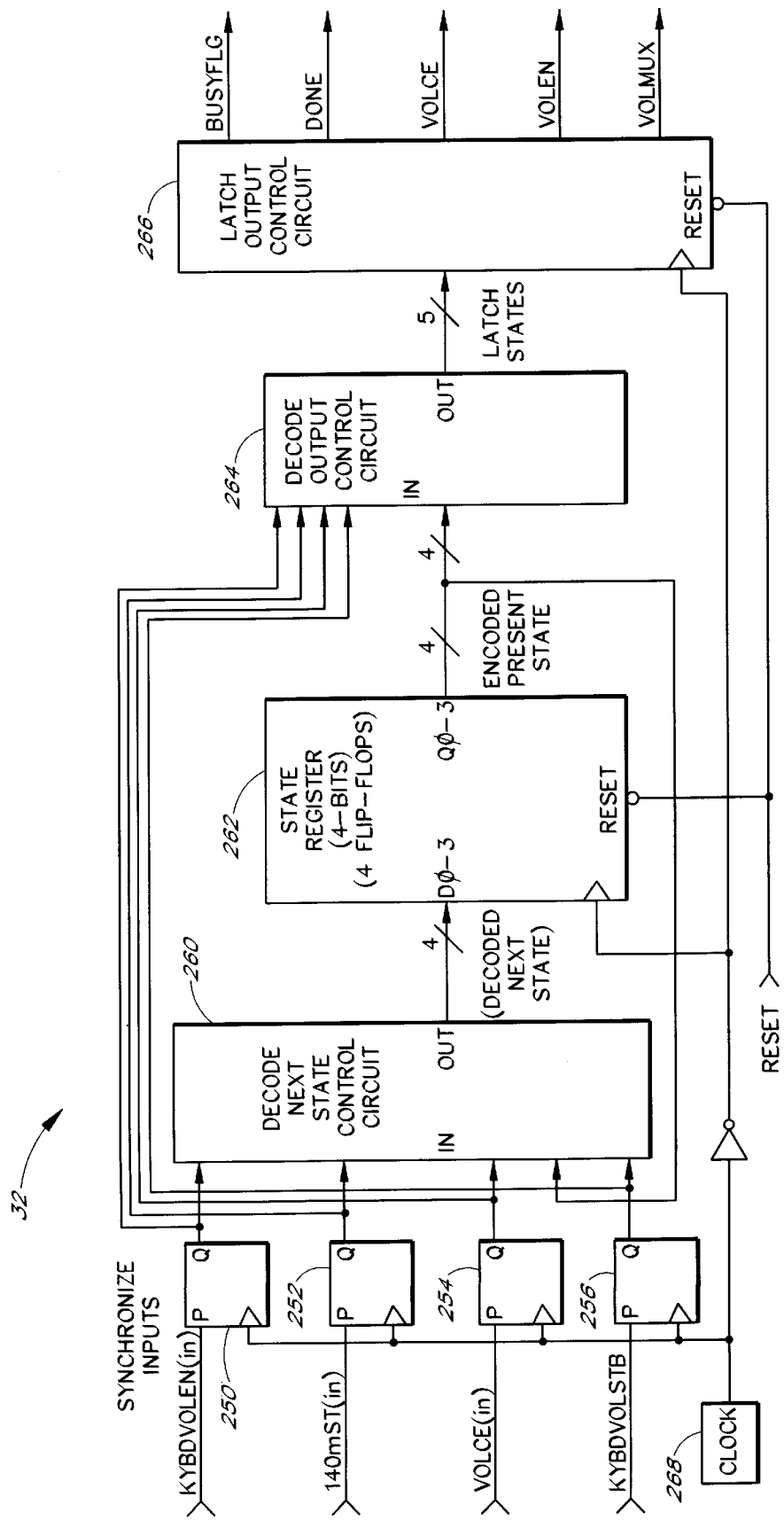
FIG. 4 is a schematic diagram of the state machine of FIG. 2.
Figure 5A:
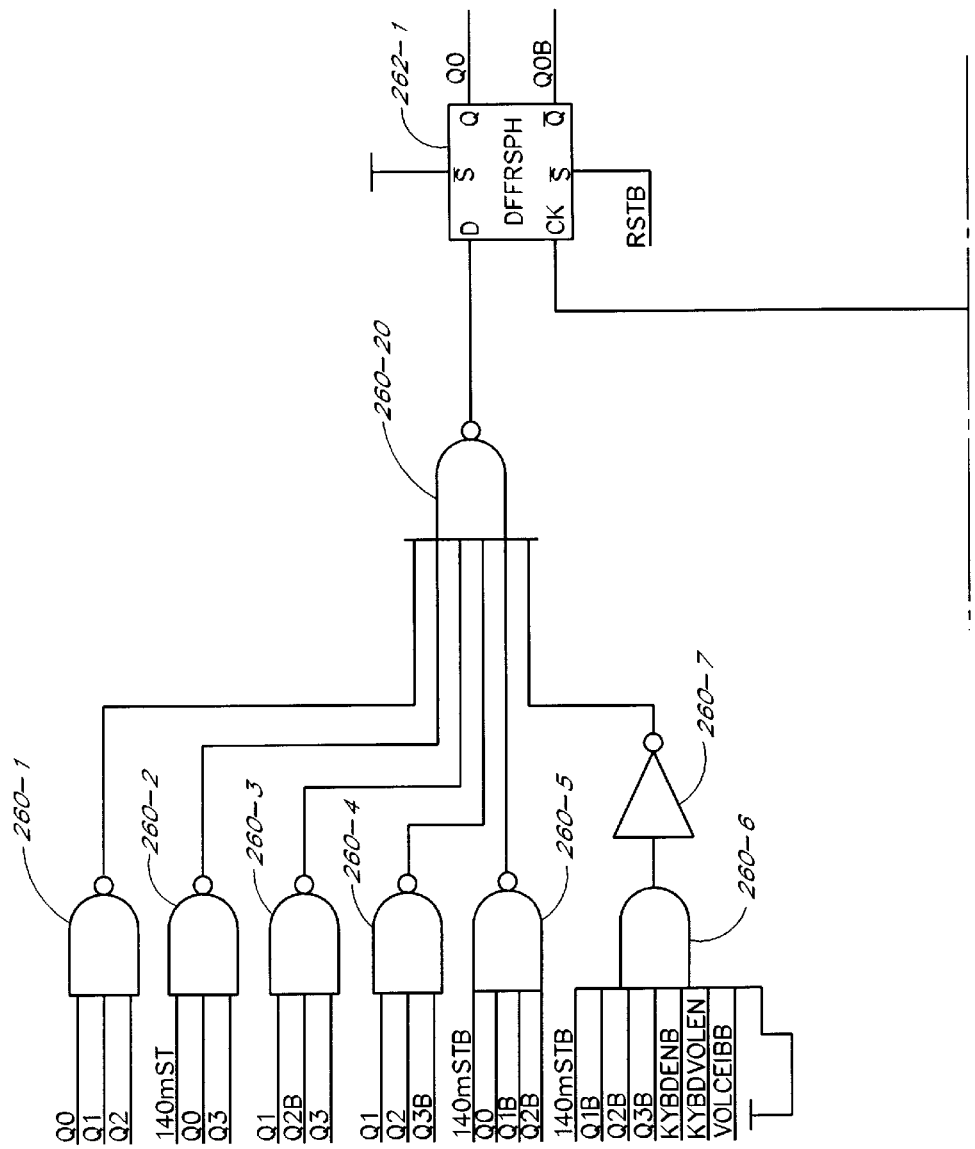
FIG. 5 is a wiring diagram of a preferred embodiment of the state machine of FIG. 4.
Figure 5B:
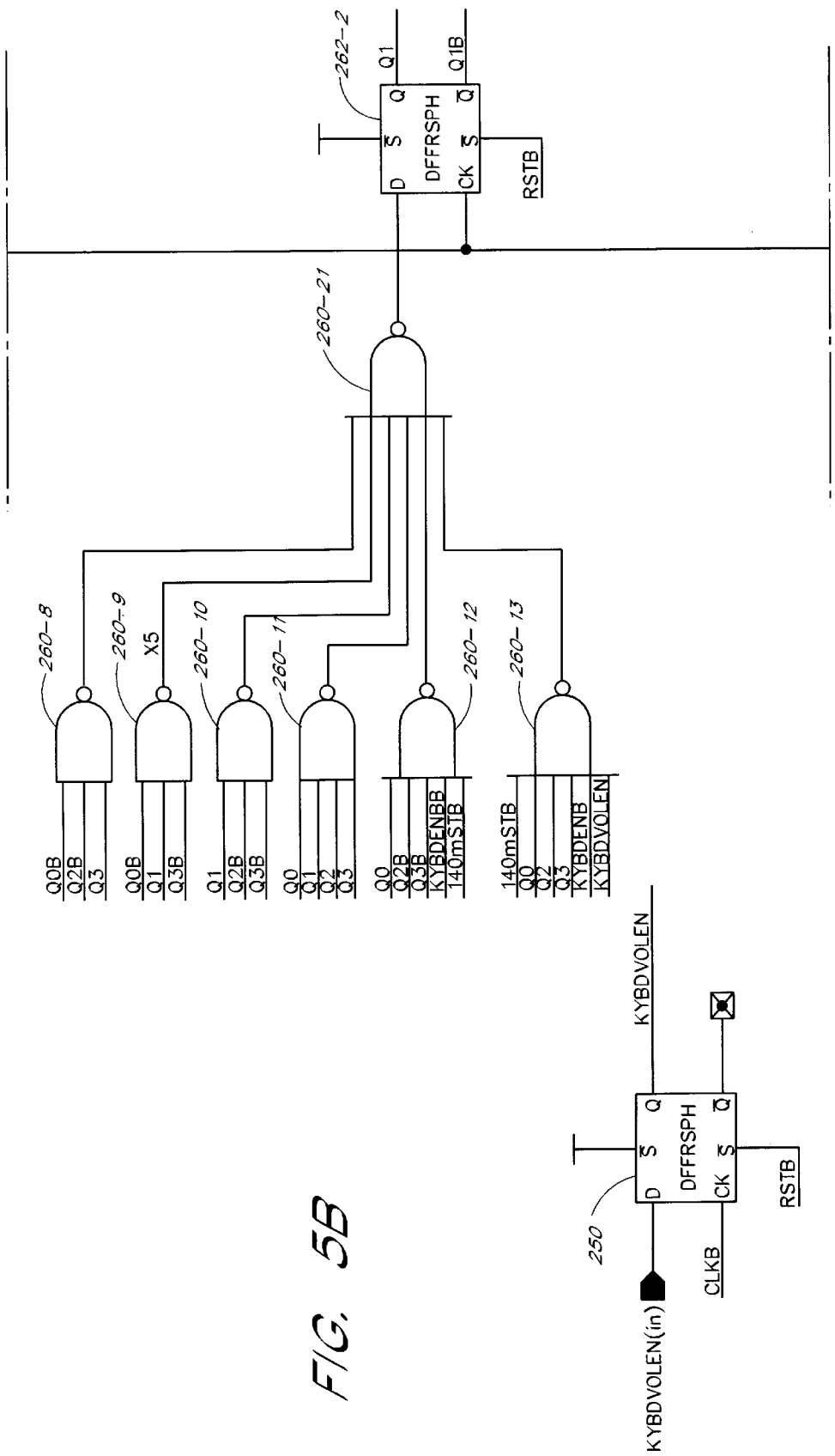
Figure 5C:
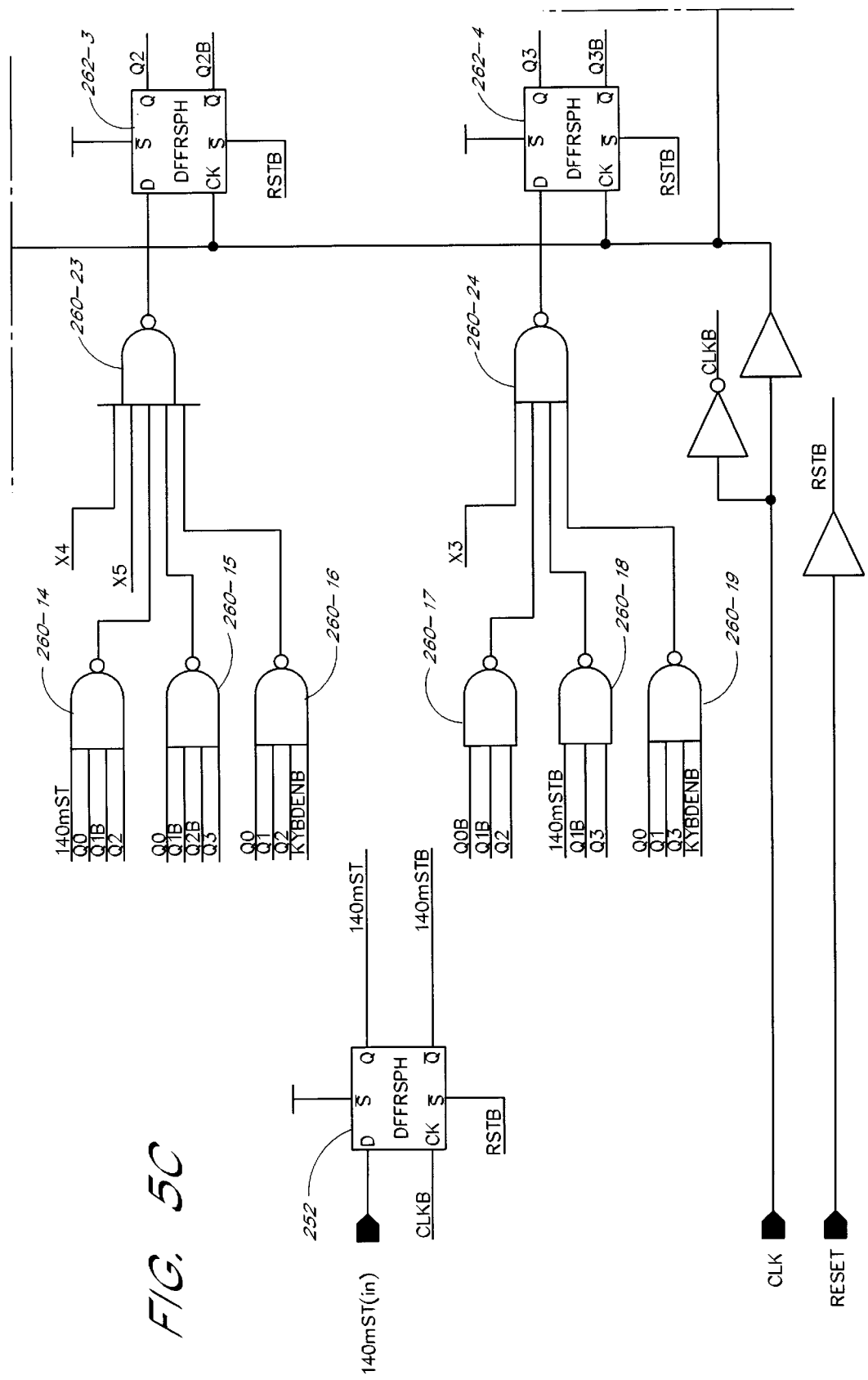
Figure 5D:
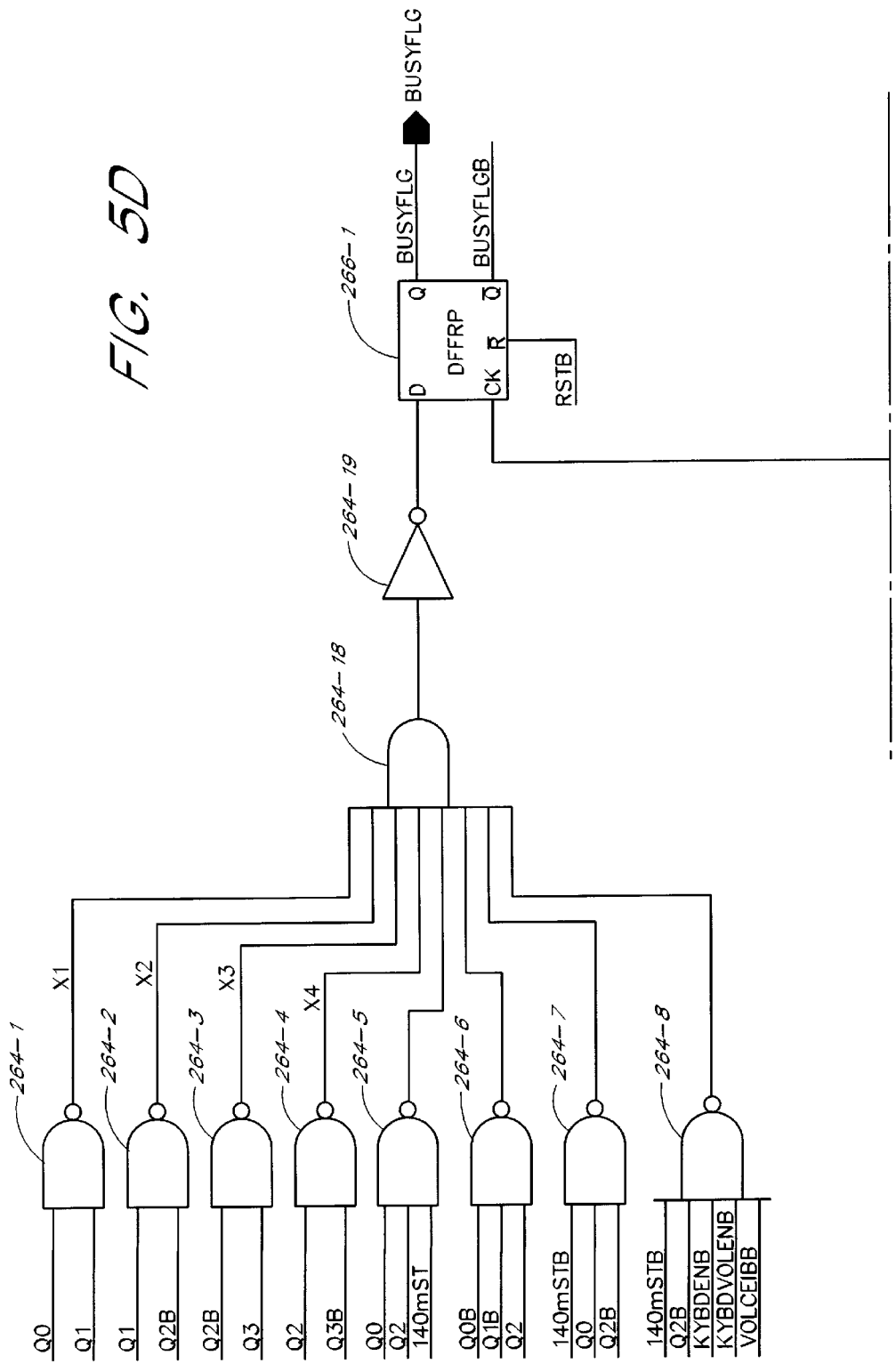
Figure 5E:
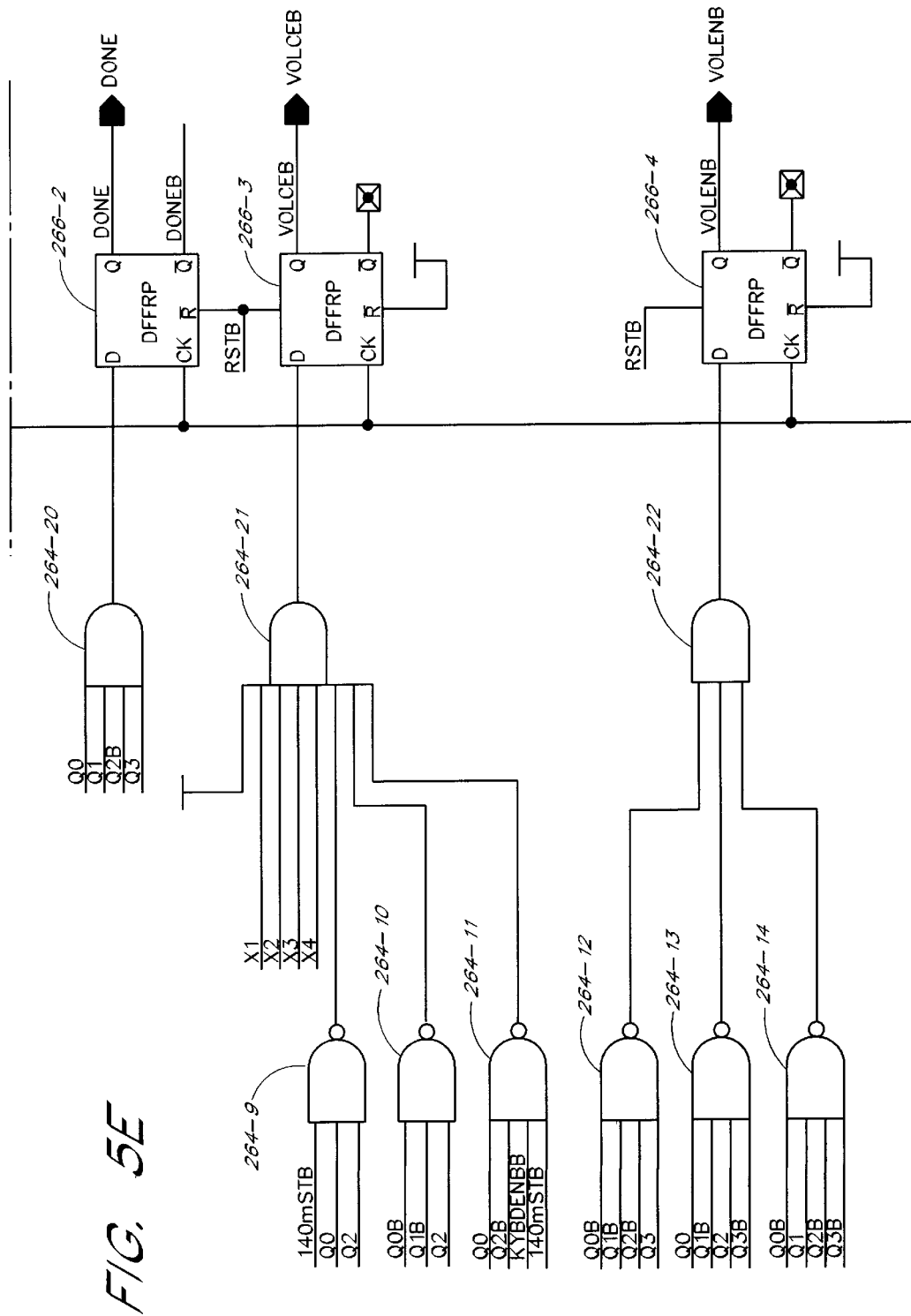
Figure 5F:
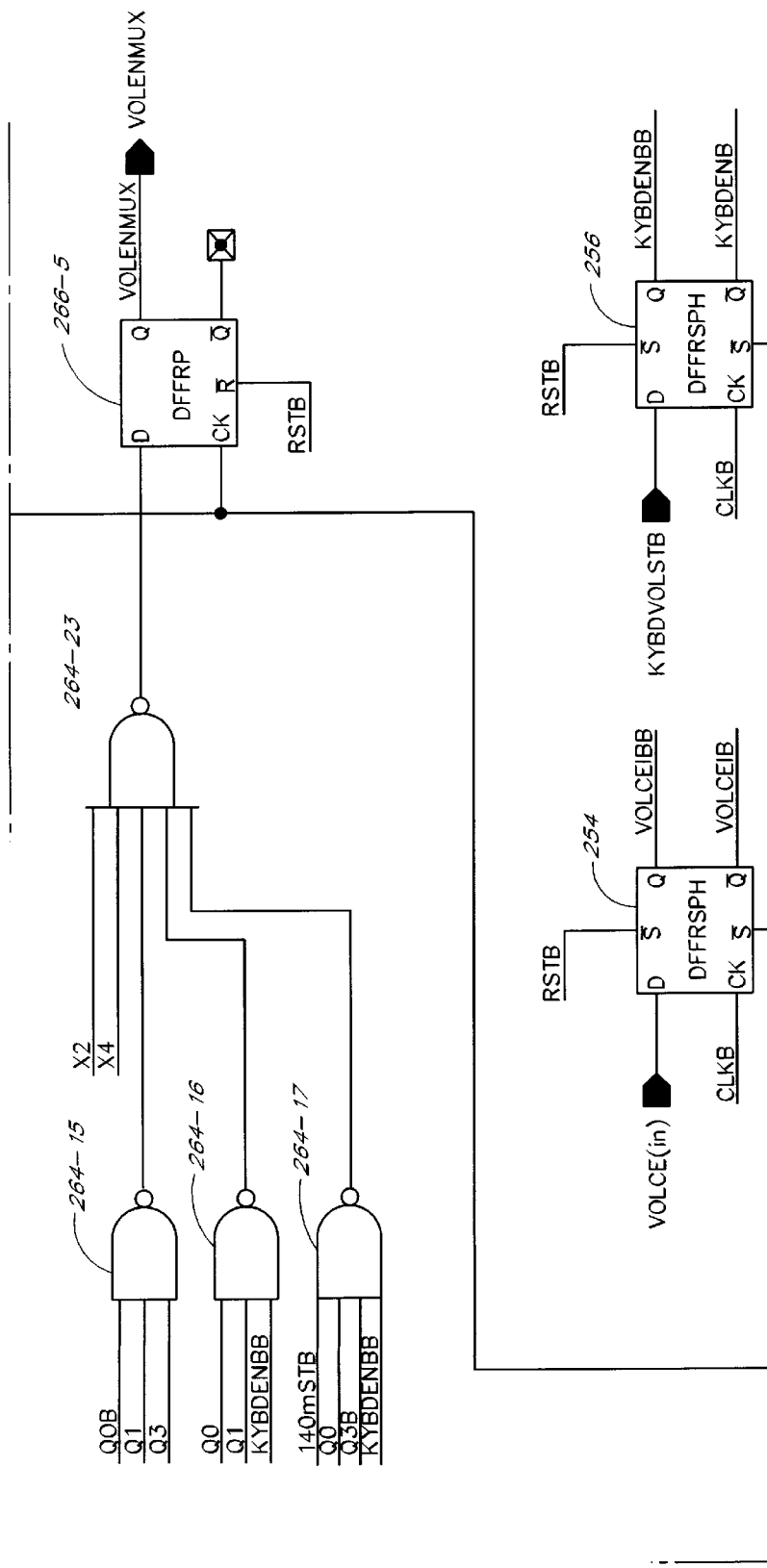

Referring now to FIG. 4, there is shown a detailed schematic diagram depicting the components and their interconnections which form the state machine 32. First, there is shown the four input signals which the state machine 32 receives, Keyboard Volume Enable, KYBDVOLEN, a signal from the 140 millisecond, retriggerable digital monostable timer 48, 140 mST, the Volume Chip Enable signal generated by the host computer 12, VOLCE (in), and the Keyboard Volume Strobe, KYBDVOLSTB, generated by the second controller section 31 in response to a user command. These signals are each input into the flip-flops 250, 252, 254 and 256. The flip-flops 250, 252, 254 and 256 synchronize the timing of the inputs, such that the state of the inputs change only on the clock edge generated by the clock 268. As a result, the KYBDVOLEN, 140 mST, VOLCE(in) and KYBDVOLEN signals are all synchronized prior to their transmission to the decode next state control circuit 260.

The decode next state control circuit 260 decodes the control signals KYBDVOLEN, 140 mST, VOLCE(in) and KYBDVOLEN and transits these signal to a state register 262 which, in the embodiment of the invention disclosed herein, is comprised of four flip-flops. The decode next state control circuit 260 determines the next state of the logic flow, as illustrated in FIG. 3, based on the inputs received from the flip-flops 250, 252, 254 and 256, and the state register 262 holds the determined state. The decode output control circuit 264 then decodes the output control signals of the state machine 32 based upon the encoded present state output by the state register 262 and the synchronized inputs from the flip-flops 250, 252, 254 and 256 and outputs latch states to a latch output control circuit 264. The control signals, BUSYFLG, DONE, VOLCE, VOLEN and VOLMUX output by the latch output control circuit 264 trigger the modification of the volume generator chip 40 and the retriggerable digital monostable timers 48 and 50.

Referring next to FIG. 5, a specific embodiment of the state diagram logically illustrated in FIG. 3 shall now be described in detail. Here, the flip-flops 250, 252, 254 and 256 are D-type flip-flops of conventional design and KYBDVOLEN is the D input to the flip-flop 250, 140 mST is the D input to the flip-flop 252, VOLCE(IN) is the D input to the flip-flop 254 and KYBDVOLSTB is the D input to the flip-flop 256. As previously described in detail, the outputs of the flip-flops 250, 252, 254 and 256 are tied to the combinatorial logic circuitry which comprises the decode next state 260.

The first logic level of the decode next state 260 includes a NAND gate 260-1 having first, second and third inputs, a NAND gate 260-2 having a first input tied to the Q output of flip-flop 252 and second and third inputs, a NAND gate 260-3 having first, second and third inputs, a NAND gate 260-4 having first, second and third inputs, a NAND gate 260-5 having a first input tied to the Q(bar) output of the flip-flop 252 and second, third and fourth inputs, an AND gate 260-6 having a first input tied to the Q(bar) output of the flip-flop 252, second, third, fourth inputs, a fifth input tied to the Q(bar) output of the flip-flop 256, a sixth input tied to the Q output of the flip-flop 250, and a seventh input tied to the Q output of the flip-flop 254, and an eighth input tied to VCC, a NAND gate 260-8 having first, second and third inputs, a NAND gate 260-9 having first, second and third inputs, a NAND gate 260-10 having first, second and third inputs, a NAND gate 260-11 having first, second, third and fourth inputs, a NAND gate 260-12 having first, second and third inputs, a fourth input tied to the Q output of the flip-flop 256 and a fifth input tied to the Q(bar) output of the flip-flop 252, a NAND gate 260-13 having a first input tied to the Q output of the flip-flop 252, second, third and fourth inputs, a fifth input tied to the Q(bar) output of the flip-flop 256 and a sixth input tied to the Q output of the flip-flop 250, a NAND gate 260-14 having a first input tied to the Q output of the flip-flop 252 and second, third and fourth inputs, a NAND gate 260-15 having first, second, third and fourth inputs, a NAND gate 260-16 having first, second and third inputs and a fourth input tied to Q(bar) output of the flip-flop 256, a NAND gate 260-17 having first, second and third inputs, a NAND gate 260-18 having a first input tied to the Q output of the flip-flop 252 and second and third inputs and a NAND gate 260-19 having first, second and third inputs and a fourth input tied to the Q(bar) output of the flip-flop 256.

The outputs of NAND gates 260-1, 260-2, 260-3, 260-4 and 260-5 are provided as first, second, third, fourth and fifth inputs to a six input NAND gate 260-20. The output of the AND gate 260-6 is inverted by invertor 260-7 and provided as sixth input to the NAND gate 260-20. In turn, the output of NAND gate 260-20 is a first input to the state register 262. Similarly, the outputs of NAND gates 260-8, 260-9, 260-10, 260-11, 260-12 and 260-13 are provided as first, second, third, fourth, fifth and sixth inputs to a six input NAND gate 260-21 and the output of NAND gate 260-21 is a second input to the state register 262. The outputs of NAND gates 260-9, 260-14, 260-15 and 260-16 are provided as second, third, fourth, and fifth inputs, respectively, to a five input NAND gate 260-23 and the output of NAND gate 260-23 is a third input to the state register 262. Finally, the outputs of NAND gates 260-17, 260-18 and 260-19 are provided as second, third and fourth inputs to a four input NAND gate 260-24 and the output of the NAND gate 260-24 is a fourth input to the state register 262.

As previously described, the outputs of NAND gates 260-20, 260-21, 260-23 and 260-24 are the outputs of the decode next state 260 which are then input to the state register 262. The state register 262 is comprised of four D-type flip flops 262-1, 262-2, 262-3 and 262-4, the outputs of which are provided as inputs to the decode output controls 264 as well as further inputs to the decode next state 260. More specifically, the output from the NAND gate 260-20 is provided as the D input to the flip-flop 262-1. The Q output of the flip-flop 262-1 is provided as the first input to the NAND gate 260-1, the second input to the NAND gate 260-2, the second input to the NAND gate 260-5, the first input to the NAND gate 260-11, the first input to the NAND gate 260-12, the second input to the NAND gate 260-13, the second input to the NAND gate 260-14, the first input to the NAND gate 260-15, the first input to the NAND gate 260-16 and the first input to the NAND gate 260-19. The Q(bar) output of the flip-flop 262-1 is provided as the first input to the NAND gate 260-8, the first input to the NAND gate 260-9 and the first input to the NAND gate 260-17.

Similarly, the output from the NAND gate 260-21 is provided as the D input to the flip-flop 262-2. The Q output of the flip-flop 262-2 is provided as the second input to the NAND gate 260-1, the first input to the NAND gate 260-3, the first input to the NAND gate 260-4, the second input to the NAND gate 260-9, the first input to the NAND gate 260-10, the second input to the NAND gate 260-11, the second input to the NAND gate 260-16 and the second input to the NAND gate 260-19. The Q(bar) output of the flip-flop 262-2 is provided as the third input to the NAND gate 260-5, the second input to the AND gate 260-6, the third input to the NAND gate 260-14, the second input to the NAND gate 260-15, the second input to the NAND gate 260-17 and the second input to the NAND gate 260-18.

Likewise, the output from the NAND gate 260-23 is provided as the D input to the flip-flop 262-3. The Q output of the flip-flop 262-3 is provided as the third input to the NAND gate 260-1, the second input to the NAND gate 260-4, the third input to the NAND gate 260-11, the third input to the NAND gate 260-13, the fourth input to the NAND gate 260-14, the third input to the NAND gate 260-16 and the third input to the NAND gate 260-17. The Q(bar) output of the flip-flop 262-3 is provided as the second input to the NAND gate 260-3, the fourth input to the NAND gate 260-5, the third input to the AND gate 260-6, the second input to the NAND gate 260-8, the second input to the NAND gate 260-10, the second input to the NAND gate 260-12, and the third input to the NAND gate 260-15.

Finally, the output from NAND gate 260-24 is provided as the D input to the flip-flop 262-4. The Q output of the flip-flop 262-4 is provided as the third input to the NAND gate 260-2, the third input to NAND gate 260-3, the third input to the NAND gate 260-8, the fourth input to the NAND gate 260-11, the fourth input to the NAND gate 260-13, the fourth input to the NAND gate 260-15, the third input to the NAND gate 260-18 and the third input to the NAND gate 260-19. The Q(bar) output of the flip-flop 262-4 is provided as the third input to the NAND gate 260-4, the fourth input to the AND gate 260-6, the third input to the NAND gate 260-9, the third input to the NAND gate 260-10 and the third input to the NAND gate 260-12.

The respective Q and Q(bar) outputs from the flip-flops 262-1, 262-2, 262-3 and 262-4 which comprise the state register 260 are further input to the decode output control circuit 264. Like the decode next state control circuit 260, the decode output control circuit 264 is comprised of combinatorial logic circuitry. The first logic level of the decode output control circuit 264 includes a NAND gate 264-1 having a first input tied to the Q output of the flip-flop 262-1 and a second input tied to the Q output of the flip-flop 262-2, a NAND gate 264-2 having a first input tied to the Q output of flip-flop 262-2 and a second input tied to the Q(bar) output of the flip-flop 262-3, a NAND gate 264-3 having a first input tied to the Q(bar) output of the flip-flop 262-3 and a second input tied to the Q output of the flip-flop 262-4, a NAND gate 264-4 having a first input tied to the Q output of the flip-flop 262-3 and a second input tied to the Q(bar) output of the flip-flop 262-4, a NAND gate 264-5 having a first input tied to the Q output of the flip-flop 262-1, a second input tied to the Q output of the flip-flop 262-3 and a third input tied to the Q output of the flip-flop 252, a NAND gate 264-6 having a first input tied to the Q(bar) output of the flip-flop 262-1, a second input tied to the Q(bar) output of the flip-flop 262-2 and a third input tied to the Q output of the flip-flop 262-3, a NAND gate 264-7 having a first input tied to the Q(bar) output of the flip-flop 252, a second input tied to the Q output of the flip-flop 262-1 and a third input tied to the Q(bar) output of the flip-flop 262-3, a NAND gate 264-8 having a first input tied to the Q(bar) output of the flip-flop 252, a second input tied to the Q(bar) output of the flip-flop 262-3, a third input tied to the Q(bar) output of the flip-flop 256, a fourth input tied to the Q output of the flip-flop 250 and a fifth input tied to the Q output of the flip flop 254, a NAND gate 264-9 having a first input tied to the Q output of the flip-flop 252, a second input tied to the Q output of the flip flop 262-1 and a third input tied to the Q output of the flip-flop 262-3, a NAND gate 264-10 having a first input tied to the Q(bar) output of the flip-flop 262-1, a second input tied to the Q(bar) output of the flip-flop 262-2 and a third input tied to the Q output of the flip-flop 262-3, a NAND gate 264-11 having a first input tied to the Q output of the flip-flop 262-1, a second input tied to the Q(bar) output of the flip-flop 262-3, a third input tied to the Q output of the flip-flop 256 and a fourth input tied to the Q(bar) output of the flip-flop 252, a NAND gate 264-12 having a first input tied to the Q(bar) output of the flip-flop 262-1, a second input tied to the Q(bar) output of the flip-flop 262-2, a third input tied to the Q(bar) output of the flip-flop 262-3 and a fourth input tied to the Q output of the flip-flop 262-4, a NAND gate 264-13 having a first input tied to the Q output of the flip-flop 262-1, a second output tied to the Q(bar) output of the flip-flop 262-2, a third input tied to the Q output of the flip-flop 262-3 and a fourth input tied to the Q(bar) output of the flip-flop 262-4, a NAND gate 264-14 having a first input tied to the Q(bar) output of the flip-flop 262-1, a second input tied to the Q output of the flip-flop 262-2, a third input tied to the Q(bar) output of the flip-flop 262-3 and a fourth input tied to the Q(bar) input of the flip-flop 262-4, a NAND gate 264-15 having a first input tied to the Q(bar) output of the flip-flop 262-1, a second output tied to the Q(bar) output of the flip-flop 262-2 and a third input tied to the Q output of the flip-flop 262-4, a NAND gate 264-16 having a first input tied to the Q output of the flip-flop 262-1, a second input tied to the Q output of the flip-flop 262-2 and a third input tied to the Q output of the flip-flop 256, and a NAND gate 264-17 having a first input tied to the Q(bar) output of the flip-flop 252, a second input tied to the Q output of the flip-flop 262-1, a third input tied to the Q(bar) output of the flip-flop 262-4 and a fourth input tied to the Q output of the flip-flop 256.

The outputs of NAND gates 264-1, 264-2, 264-3, 264-4, 264-5, 264-6, 264-7 and 264-8 are provided as first, second, third, fourth, fifth, sixth, seventh and eighth inputs to a eight input AND gate 264-18. In turn, the output of the AND gate 264-18 is input an invertor 264-19 and the output of the invertor 264-19 is a first input to the latch output control circuit 266. In addition, the output of NAND gate 264-3 is also provided as the first input to NAND gate 260-24, the output of NAND gate 264-4 as the first input to NAND gate 260-23. Similarly, the Q output of the flip-flop 262-1, the Q output of the flip-flop 262-2, the Q(bar) output of the flip-flop 262-3 and the Q output of the flip-flop 262-4 are provided as first, second, third and fourth inputs to a four input AND gate 264-20 and the output of AND gate 264-20 is a second input to the latch output control circuit 266. Likewise, the output of NAND gates 264-1, 264-2, 264-3, 264-4, 264-9, 264-10 and 264-11 are provided as second, third, fourth, fifth, sixth, seventh and eight inputs to an eight input AND gate 264-21 (the first input of the AND gate 264-21 is tied to VCC) and the output of AND gate 264-21 is a third input to the latch output control circuit 266. The output of NAND gates 264-12, 264-13 and 264-14 are provided as first, second and third inputs to a three input AND gate 264-22 and the output of AND gate 264-22 is a fourth input to the latch output control circuit 266. Finally, the outputs of NAND gates 264-2, 264-4, 264-15, 264-16 and 264-17 are provided as first, second, third, fourth, and fifth inputs to a four input NAND gate 264-23 and the output of NAND gate 264-13 is a fifth input to the latch output control circuit 266.

As previously described, the latch output control circuit 266 is comprised of five flip-flops tied to the outputs of the decode output control circuit 264. More specifically, the latch output control circuit is comprised of first, second, third, fourth and fifth D-type flip flops 266-1, 266-2, 266-3, 266-4 and 266-5 having their D inputs tied to the output of invertor 264-19, AND gate 264-20, AND gate 264-21, AND gate 264-22 and AND gate 264-23, respectively and having Q outputs BUSYFLG, DONE, VOLCE, VOLEN, and VOLENMUX, respectively.

Thus, there has been described and illustrated herein an independent control circuit which provides a dual path control system which permits alternate control of a peripheral device associated with a host computer via the host computer itself or via an independent control circuit Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. A computer system comprising:

a host computer;

an independent control circuit;

a peripheral device having inputs electrically connected to an output of said host computer and to an output of said independent control circuit, respectively;

a single input means for generating control signals to be input to said peripheral device and data and control signals to be input to said host computer;

means having an input connected to an output of said single input means and outputs connected to said independent control circuit and said host computer, respectively, and responsive to receipt of signals from said single input means for directing said peripheral device control signals to said independent control circuit for processing and for directing said host computer data and control signals only to said host computer for processing;

means connected between said independent control circuit and said peripheral device for transmitting control signals produced by said processing of said peripheral device control signals by said independent control circuit to said peripheral device; and wherein said independent control circuit is not subject to control by said host computer.

2. A system as set forth in claim 1 wherein said single input means generates additional control signals for said peripheral device, said directing means transmitting said additional peripheral device control signals to said host computer for processing and wherein said system further comprises means having inputs connected to said independent control circuit and said host computer and an output connected to said peripheral device for arbitrating between said peripheral device control signals produced by said independent control circuit and peripheral device control signals produced by said processing of said additional peripheral device control signals by said host computer.

3. A system as set forth in claim 1 wherein said host computer processes additional control signals to be input to said peripheral device and wherein said system further comprises means having inputs connected to said independent control circuit and said host computer and an output connected to said peripheral device for arbitrating between said peripheral device control signals output by said independent control circuit and said peripheral device control signals output by said host computer.

4. A system as set forth in claim 3 wherein said independent control circuit further comprises a state machine for generating timing signals in response to receipt of said peripheral device control signals directed to said independent control circuit by said means for directing.

5. A system as set forth in claim 4 wherein said means for arbitrating comprises multiplexer means having first and second inputs electrically connected to an output of said state machine and an output of said host computer, respectively, and an output connected to an input of said peripheral device for providing control signals thereto.

6. A system as set forth in claim 3 wherein said single input means further comprises means for generating said peripheral device control signals in a predetermined sequence, said means for directing transmitting signals corresponding to said predetermined sequence to said independent control circuit.

7. A system as set forth in claim 1 wherein said single input means is a computer keyboard.

8. A system as set forth in claim 1 wherein said means for directing comprises an input controller having a first section dedicated to said host computer and a second section dedicated to said independent control circuit.

9. A system as set forth in claim 8 wherein said means for directing comprises an input controller comprising parallel programmed code which enables said input controller to trap specific programmable key sequences generated by said keyboard, said parallel programmed code directing control signals to said independent control circuit upon trapping said specific programmable key sequence.

10. A system as set forth in claim 9 wherein said first section of said input controller has a first output means and said second section of said input controller has a second output means, said first and second output means independently transmitting signals to said host computer and said independent control circuit, respectively, and wherein said input controller is configured to process said specific programmable key sequences to be directed to said independent control circuit independent of signals to be directed to said host computer.

11. A system as set forth in claim 1 further comprising a status bit generator having an output connected to a second input of said independent control circuit, said status bit generator disabling production of said control signals by said independent control circuit for a predetermined time period following power up of said system.

12. A system as set forth in claim 1 wherein said directing means prevents said peripheral device control signals from being directed to said host computer.

13. In a computer system which includes a peripheral device and a host computer electrically associated with said peripheral device for the control thereof, a system for controlling said peripheral device independent of and simultaneous with ongoing operations being performed by said host computer, said system comprising:

a computer keyboard for generating data and control signals for said host computer and host-independent control signals for said peripheral device, said computer keyboard having an output for transmitting said generated signals;

a state machine;

an input controller having an input connected to said computer keyboard output, a first output connected to an input of said host computer and a second output connected to an input of said state machine, said input controller directing said host-independent peripheral device control signals to said state machine for processing and directing said host computer data and control signals only to said host computer for processing, wherein said state machine generates timing signals for controlling said peripheral device at said state machine output in response to said host-independent peripheral device control signals received from said input controller;

a multiplexer having a first input connected to an output of said state machine, a second input connected to an output of said host computer, and an output connected to an input of said peripheral device, said multiplexer selectively transmitting signals generated by said state machine or signals generated by said host computer to said peripheral device; and wherein said state machine is not subject to control by said host computer.

14. A system as set forth in claim 13 wherein said keyboard further comprises means for generating programmable key sequences for controlling said peripheral device.

15. A system as set forth in claim 13 wherein said input controller further comprises means for capturing programmable key sequences generated by said keyboard and transmitting said captured sequences to said state machine.

16. A system as set forth in claim 13 wherein said state machine further comprises a second input connected to said host computer output for receiving output signals from said host computer indicative of whether said host computer is controlling said peripheral device.

17. A system as set forth in claim 16 wherein said state machine further comprises combinatorial logic circuitry connected to said first and second inputs, said logic circuitry disabling transmission of said host-independent control signals when said host computer is controlling said peripheral device.

18. A system as set forth in claim 13 and further comprising a counter which provides level indicator means for said peripheral device, said counter having at least one input connected to said multiplexer output for detecting transmission of control signals to said peripheral device.

19. A system as set forth in claim 13 and further comprising a tone generator electrically connected to said state machine output for receiving an output signal indicating transmission of control signals to said peripheral device and generating an audio signal in response thereto.

20. A system as set forth in claim 13 and further comprising a status bit generator having an output connected to a second input of said state machine, said status bit generator disabling production of said control signals by said independent control circuit for a predetermined time period following power up of said system.

21. A system as set forth in claim 13 wherein said input controller prevents said host-independent peripheral device control signals from being directed to said host computer.

* * * * *